US010989873B1

(12) United States Patent
Jacob et al.

(10) Patent No.: US 10,989,873 B1
(45) Date of Patent: Apr. 27, 2021

(54) WAVEGUIDE CROSSINGS HAVING ARMS SHAPED WITH A NON-LINEAR CURVATURE

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Ajey Poovannummoottil Jacob, Watervliet, NY (US); Yusheng Bian, Ballston Lake, NY (US); Sujith Chandran, Abu Dhabi (AE); Marcus Dahlem, S. M. Feira (PT)

(73) Assignees: GLOBALFOUNDRIES U.S. INC., Santa Clara, CA (US); KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 16/663,696

(22) Filed: Oct. 25, 2019

(51) Int. Cl.
G02B 6/12 (2006.01)
G02B 6/125 (2006.01)
G02B 6/122 (2006.01)

(52) U.S. Cl.
CPC ......... *G02B 6/125* (2013.01); *G02B 6/12002* (2013.01); *G02B 6/1228* (2013.01); *G02B 2006/12061* (2013.01); *G02B 2006/12097* (2013.01)

(58) Field of Classification Search
CPC .. G02B 6/125; G02B 6/12002; G02B 6/1228; G02B 2006/12061; G02B 2006/12097

USPC .......................................................... 385/28
See application file for complete search history.

(56) References Cited

U.S. PATENT DOCUMENTS

| | | | |
|---|---|---|---|
| 9,709,738 B1 * | 7/2017 | Dumais | G02B 6/14 |
| 2005/0213873 A1 | 9/2005 | Piede et al. | |
| 2013/0108208 A1 | 5/2013 | Doerr | |
| 2014/0325827 A1 * | 11/2014 | Lipson | G02B 6/125 29/592 |
| 2017/0212304 A1 * | 7/2017 | Sacher | G02B 6/12002 |
| 2017/0254951 A1 | 9/2017 | Dumais et al. | |
| 2019/0331852 A1 * | 10/2019 | Uchida | G02B 6/1228 |

OTHER PUBLICATIONS

Sacher et al., "Tri-layer silicon nitride-on-silicon photonic platform for ultra-low-loss crossings and interlayer transitions", © 2017 Optical Society of America.

(Continued)

*Primary Examiner* — Jerry M Blevins
(74) *Attorney, Agent, or Firm* — Thompson Hine LLP; Anthony Canle

(57) ABSTRACT

Structures for a waveguide crossing and methods of fabricating a structure for a waveguide crossing. A waveguide crossing includes a central section and an arm positioned between a waveguide core and the central section. The arm and the waveguide core are aligned along a longitudinal axis. The arm is coupled to the waveguide core at a first interface, and the arm is coupled to a portion of the central section at a second interface. The arm has a first width at the first interface, a second width at the second interface, and a third width between the first interface and the second interface. The third width is greater than either the first width or the second width.

20 Claims, 6 Drawing Sheets

(56) References Cited

OTHER PUBLICATIONS

Bock et al., "Subwavelength grating crossings for silicon wire waveguides", ©2010 Optical Society of America.
Ma et al., "Ultralow loss single layer submicron silicon waveguide crossing for SOI optical interconnect", © 2013 Optical Society of America.
Zhang et al., "A compact and low-loss silicon waveguide crossing for O-band optical interconnect", Proc. SPIE 8990, Silicon Photonics IX, 899002 (Mar. 8, 2014).
Bogaerts et al., "Low-loss, low-cross-talk crossings for silicon-on-insulator nanophotonic waveguides", © 2007 Optical Society of America.
Jones et al., "Ultra-low crosstalk, CMOS compatible waveguide crossings for densely integrated photonic interconnection networks", © 2013 Optical Society of America.
Shang et al., "Low-loss compact multilayer silicon nitride platform for 3D photonic integrated circuits" © 2015 Optical Society of America.

* cited by examiner

WAVEGUIDE CROSSINGS HAVING ARMS SHAPED WITH A NON-LINEAR CURVATURE

BACKGROUND

The present invention relates to photonics chips and, more specifically, to structures for a waveguide crossing and methods of fabricating a structure for a waveguide crossing.

Photonics chips are used in many applications and systems including, but not limited to, data communication systems and data computation systems. A photonics chip integrates optical components, such as waveguides, optical switches, directional couplers, and bends, and electronic components, such as field-effect transistors, into a unified platform. Among other factors, layout area, cost, and operational overhead may be reduced by the integration of both types of components on the same chip.

A waveguide crossing is building block used in photonics chips to provide paths for propagating optical signals. A waveguide crossing is an optical element in which two waveguide cores in a single layer intersect and directly cross. An ideal waveguide crossing may be designed with measures to provide high transmission in each straight path and low crosstalk to the corresponding crossing path. However, despite these measures, waveguide cores may unwantedly exhibit high insertion loss and high cross-talk. In addition, waveguide crossings possess large footprints that may hamper dense integration in a photonics chip.

Improved structures for a waveguide crossing and methods of fabricating a structure for a waveguide crossing are needed.

SUMMARY

In an embodiment of the invention, a structure includes a waveguide crossing including a central section and an arm positioned between a waveguide core and the central section. The arm and the waveguide core are aligned along a longitudinal axis. The arm is coupled to the waveguide core at a first interface, and the arm is coupled to a portion of the central section at a second interface. The arm has a first width at the first interface, a second width at the second interface, and a third width between the first interface and the second interface. The third width is greater than the first width, and the third width greater than the second width.

In an embodiment of the invention, a structure includes a first waveguide crossing having a first central section and a first plurality of arms connected to the first central section. The structure further includes a second waveguide crossing positioned over the first waveguide crossing. The second waveguide crossing includes a second central section and a second plurality of arms connected to the second central section. The first waveguide crossing is comprised of a first material, and the second waveguide crossing is comprised of a second material that is different in composition from the first material.

In an embodiment of the invention, a method includes patterning a layer of material to define a waveguide core and a waveguide crossing that includes a central section and an arm positioned between the waveguide core and the central section. The arm and the waveguide core are aligned along a longitudinal axis. The arm is coupled to the waveguide core at a first interface, and the arm is coupled to a portion of the central section at a second interface. The arm has a first width at the first interface, a second width at the second interface, and a third width between the first interface and the second interface. The third width is greater than the first width, and the third width is greater than the second width.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 8A is a top view of a structure in which FIG. 8 is taken generally along line 8-8 and in which layers are omitted for purposes of clarity of description.

DETAILED DESCRIPTION

Figure 1:
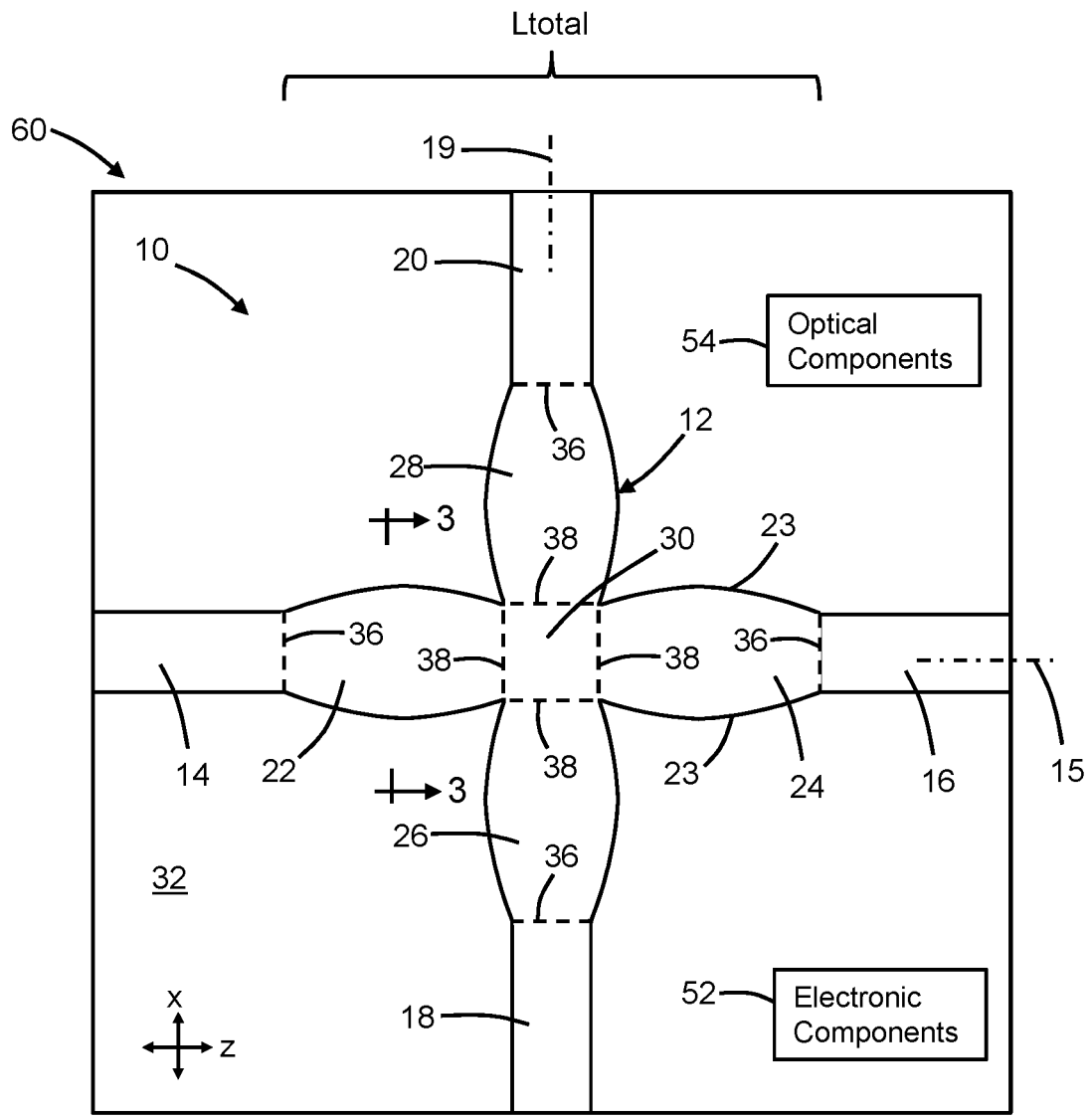
FIG. 1 is a diagrammatic top view of a structure at an initial fabrication stage of a processing method in accordance with embodiments of the invention.
Figure 2:
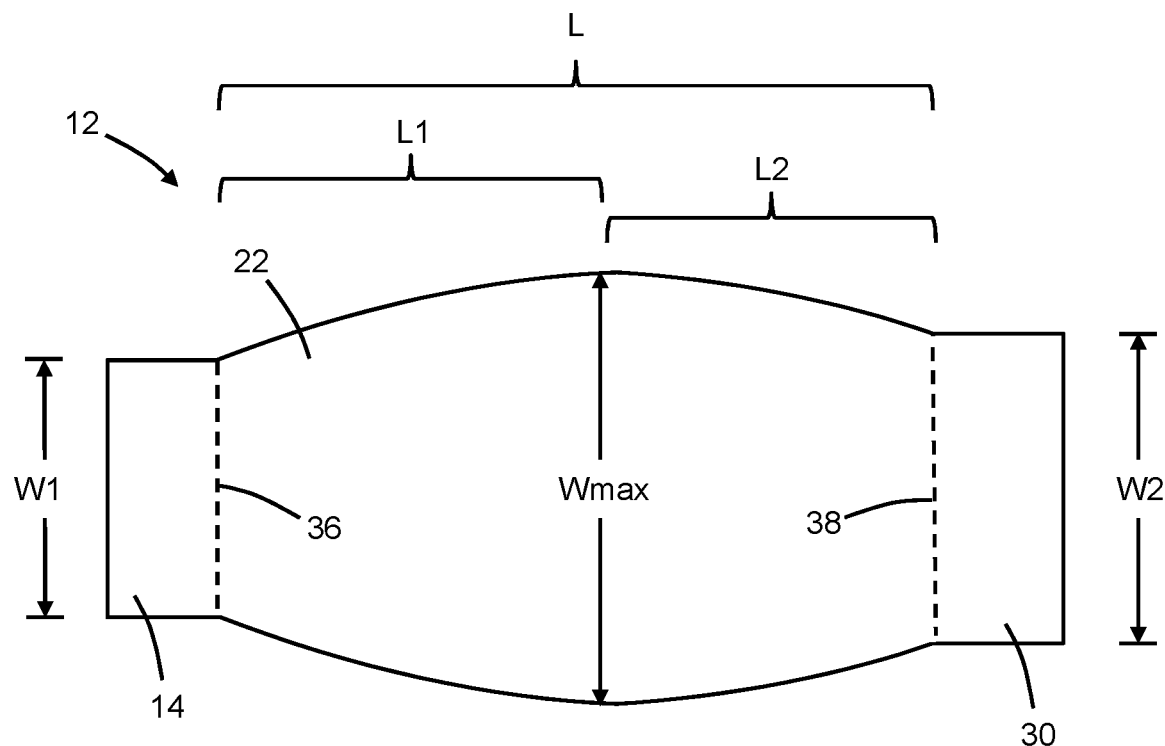
FIG. 2 is an enlarged view of a portion of FIG. 1.
Figure 3:
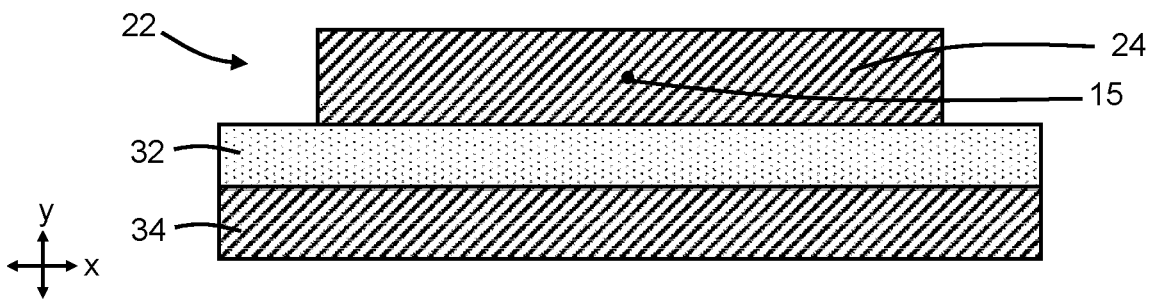
FIG. 3 is a cross-sectional view taken generally along line 3-3 in FIG. 1.

With reference to FIGS. 1-3 and in accordance with embodiments of the invention, a structure 10 includes a waveguide crossing 12, a waveguide core 14 and a waveguide core 16 that are coupled to respective arms 22, 24 of the waveguide crossing 12 to respectively provide an input port and a through port, and a waveguide core 18 and a waveguide core 20 that are coupled to respective arms 26, 28 of the waveguide crossing 12 to provide a cross port. The waveguide crossing 12 includes a central section 30 providing a junction that is arranged between the arms 22, 24 of the waveguide crossing 12 along the longitudinal axis 15, and also arranged between the arms 26, 28 of the waveguide crossing 12 along the longitudinal axis 19. Each of the arms 22, 24, 26, 28 is coupled to a different portion of the central section 30. The waveguide cores 14, 16 and the arms 22, 24 of the waveguide crossing 12 are aligned along a longitudinal axis 15, and the waveguide cores 18, 20 and the arms 26, 28 of the waveguide crossing 12 are aligned along a longitudinal axis 19 that is oriented transverse to the longitudinal axis 15 of the waveguide cores 14, 16. In an embodiment, the longitudinal axes 15, 19 may be oriented orthogonal to each other.

The waveguide crossing 12 and the waveguide cores 14, 16, 18, 20 may be composed of single-crystal semiconductor material (e.g., single-crystal silicon). The waveguide crossing 12 and the waveguide cores 14, 16, 18, 20 may be formed by patterning a device layer of a silicon-on-insulator (SOI) wafer with lithography and etching processes that form an etch mask over the device layer and etch the masked device layer with an etching process, such as reactive ion etching (ME), in which the buried insulator layer 32 functions as an etch stop. The waveguide crossing 12 and the waveguide cores 14, 16, 18, 20 may be arranged on a buried insulator layer 32 of the SOI wafer. The buried insulator layer 32 may be composed of a dielectric material, such as silicon dioxide, and buried insulator layer 32 is arranged over a substrate 34 that may contain single-crystal semiconductor material (e.g., single-crystal silicon). The waveguide crossing 12 and the waveguide cores 14, 16, 18, 20 may have a ridge construction. The buried insulator layer 32 may operate as a lower cladding providing confinement for the waveguide crossing 12 and the waveguide cores 14, 16, 18, 20 of the structure 10.

Each of the arms 22, 24, 26, 28 may have shapes with curvatures that are identical or substantially identical with respect to the central section 30 other than orientation along the respective longitudinal axis 15, 19. The arms 22, 24, 26, 28 are subsequently discussed in connection with the arm 22 with an understanding that the subsequent discussion applies equally to the arms 24, 26, 28.

The arm 22 has an interface 36 with the waveguide core 14 defining an input to the arm 22, and the arm 22 has an interface 38 with the central section 30 defining an output from the arm 22. The arm 22 has a width, W1, at the interface 36 with the waveguide core 14, a width, W2, at the interface 38 with the central section 30, and a maximum width, Wmax, that is located along the longitudinal axis 15 between the interface 36 and the interface 38. The location of the maximum width between the interfaces 36, 38 differs from a conventional taper or inverse taper in which the maximum width occurs at either the beginning or end of the taper. The maximum width, Wmax, is greater than the width, W1, at the interface 36 with the waveguide core 14 and the width, W2, at the interface 38 with the central section 30. The central section 30 is square in shape with the width of each side equal to the width, W2.

The arm 22 extends along a total length, L, along the longitudinal axis 15 between the interface 36 and the interface 38. The arm 22 has a section positioned between the interface 36 and the location of the maximum width, Wmax. The total length, L, is divided into a length, L1, of the section positioned between the location of the maximum width, Wmax, and the interface 36 and a length, L2, of the section positioned between the location of the maximum width, Wmax, and the interface 38. In an embodiment in which the width, W1, at the interface 36 and the width, W2, at the interface 38 are unequal, the location of the maximum width, Wmax, is asymmetrically positioned between the interface 36 and the interface 38. For example, if the width, W1, at the interface 36 with the waveguide core 14 is less than the width, W2, at the interface 38 with the central section 30, then the value of the length, L1 is greater than the value of the length, L2, such that the location of the maximum width, Wmax, is closer to the interface 38 with the central section 30 than to the interface 36 with the waveguide core 14. In an embodiment in which the width, W1, at the interface 36 and the width, W2, at the interface 38 are equal, the location of the maximum width, Wmax, may be symmetrically positioned between the interface 36 and the interface 38.

The shape of the arm 22 has an envelope at its side surfaces 23 with a curvature at each of its side surfaces 23 that may be described by a non-linear function. In an embodiment, the shape of the arm 22 has an envelope at its side surfaces 23 with a curvature at each of its side surfaces 23 that may be described by a cosine function. Specifically, the width of the shape for the arm 22 as a function of position, x, along the longitudinal axis 15 may be given by $W(x) = Wmax \cdot \cos(\pi x / 2L0)$ wherein L0 is the position along the longitudinal axis 15 that the cosine curve converges at and crosses the longitudinal axis 15 (i.e., W=0). The maximum width, Wmax, of the curvature occurs at x=0. In an alternative embodiment, the width of the shape of the arm 22 as a function of position along the longitudinal axis 15 may be described by a sine function $W(x) = Wmax \cdot \sin(\pi x / 2L)$ defining the curvature of the envelope.

Given a set of widths, W1, W2, Wmax, values may be calculated for the lengths L1 and L2 of the different sections of the arm 22. The length, L1, is dependent on a ratio of the width, W1, to the width, Wmax, and the length, L2, is dependent on a ratio of the width, W2, to the width, Wmax. Specifically, the absolute value of L1 is equal to $(2L0/\pi) \cdot \arccos(W1/Wmax)$, and the absolute value of L2 is equal to $(2L0/\pi) \cdot \arccos(W2/Wmax)$.

The total length, Ltotal, of the waveguide crossing 12 along the set of arms 22, 24 between the interface 36 of the arm 22 with the waveguide core 14 and the interface 36 of the arm 24 with the waveguide core 16 is equal to $(2 \cdot L) + W2$. Similarly, the total length of the waveguide crossing 12 along the set of arms 26, 28 between the interface 36 of the arm 26 with the waveguide core 18 and the interface 36 of the arm 28 with the waveguide core 20 is also equal to $(2 \cdot L) + W2$. Consequently, the waveguide crossing 12 has a rotational symmetry of the order four (4).

The waveguide crossing 12 has a compact footprint due to the non-linear curved shapes of the arms 22, 24, 26, 28. The waveguide crossing 12 may be characterized by low insertion loss, low cross-talk, low reflection, and low wavelength dependency also due to the non-linear curved shapes of the arms 22, 24, 26, 28. The waveguide crossing 12 may be optimized for the O-band (1260 nm to 1360 nm) and may be optimized for transmitting optical signals with transverse electric (TE) polarization.

Figure 4:
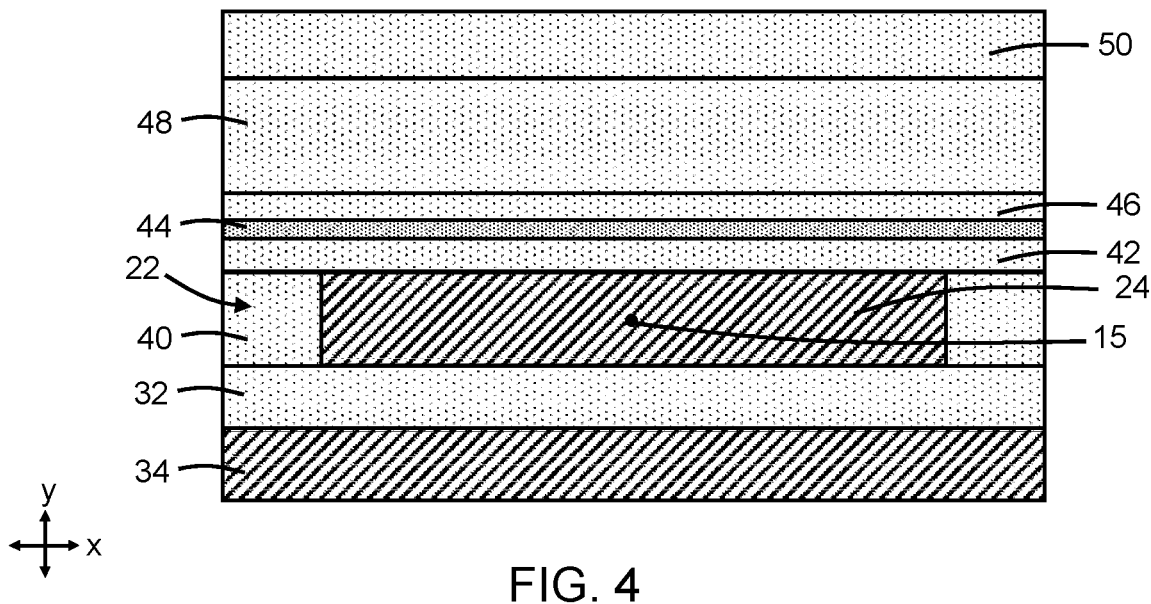
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage, dielectric layers 40, 42, 44, 46 composed of respective dielectric materials are sequentially formed in a layer stack over the waveguide crossing 12 and the waveguide cores 14, 16, 18, 20. In the layer stack, the dielectric layer 40 is arranged over the buried insulator layer 32, the waveguide crossing 12 and the waveguide cores 14, 16, 18, 20, the dielectric layer 42 is arranged over the dielectric layer 40, the dielectric layer 44 is arranged over the dielectric layer 42, and the dielectric layer 46 is arranged over the dielectric layer 44. The waveguide crossing 12 and the waveguide cores 14, 16, 18, 20 are embedded or buried in the dielectric material of the dielectric layer 40, which acts as lateral cladding.

The dielectric layer 40 may be composed of a dielectric material, such as silicon dioxide, deposited by chemical vapor deposition and planarized with, for example, chemical mechanical polishing to remove topography. The dielectric layer 42 may be composed of dielectric material, such as silicon dioxide, deposited by chemical vapor deposition or atomic layer deposition over the dielectric layer 40. The dielectric layer 44 may be composed of dielectric material, such as silicon nitride, deposited by chemical vapor deposition or atomic layer deposition over the dielectric layer 42. The dielectric layer 46 may be composed of dielectric material, such as silicon dioxide, deposited by chemical vapor deposition or atomic layer deposition over the dielectric layer 44. The dielectric layers 42, 44, 46 may be planar layers arranged in the layer stack over the planarized top surface of the dielectric layer 40.

A dielectric layer 48 of a contact level is formed by middle-of-line processing over the dielectric layer 46. The dielectric layer 48 may be composed of dielectric material, such as silicon dioxide, deposited by chemical vapor deposition using ozone and tetraethylorthosilicate (TEOS) as reactants.

A back-end-of-line stack, generally indicated by reference numeral 50, is formed by back-end-of-line processing over the dielectric layer 48 and the structure 10. The back-end-of-line stack 50 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers.

The structure 10, in any of its embodiments described herein, may be integrated into a photonics chip 60 (FIG. 1) that may include electronic components 52 and optical components 54 in addition to the waveguide crossing 12 and the waveguide cores 14, 16, 18, 20. The electronic components 52 may include, for example, field-effect transistors that are fabricated by CMOS front-end-of-line (FEOL) processing using the device layer of the SOI wafer.

Figure 5:
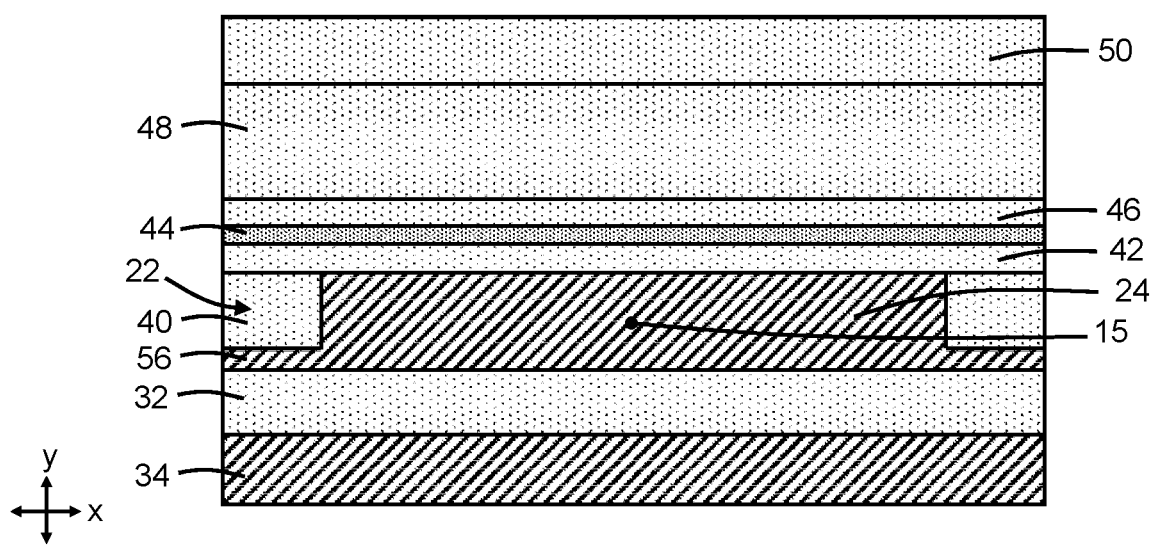
FIGS. 5-7 are cross-sectional views of structures in accordance with alternative embodiments of the invention.

With reference to FIG. 5 in which like reference numerals refer to like features in FIG. 2 and in accordance with alternative embodiments of the invention, the device layer may be partially etched adjacent to sidewalls of the waveguide crossing 12 and the waveguide cores 14, 16, 18, 20 during patterning to define a slab layer 56. The slab layer 56, which is in direct contact with the buried insulator layer 32, is coupled to the waveguide crossing 12 and the waveguide cores 14, 16, 18, 20. The slab layer 56 is thinner than the waveguide crossing 12 and the waveguide cores 14, 16, 18, 20, which are masked during the patterning forming the slab layer 56. The waveguide crossing 12 and the waveguide cores 14, 16, 18, 20 may have a rib construction due to the addition of the slab layer 56.

Figure 6:
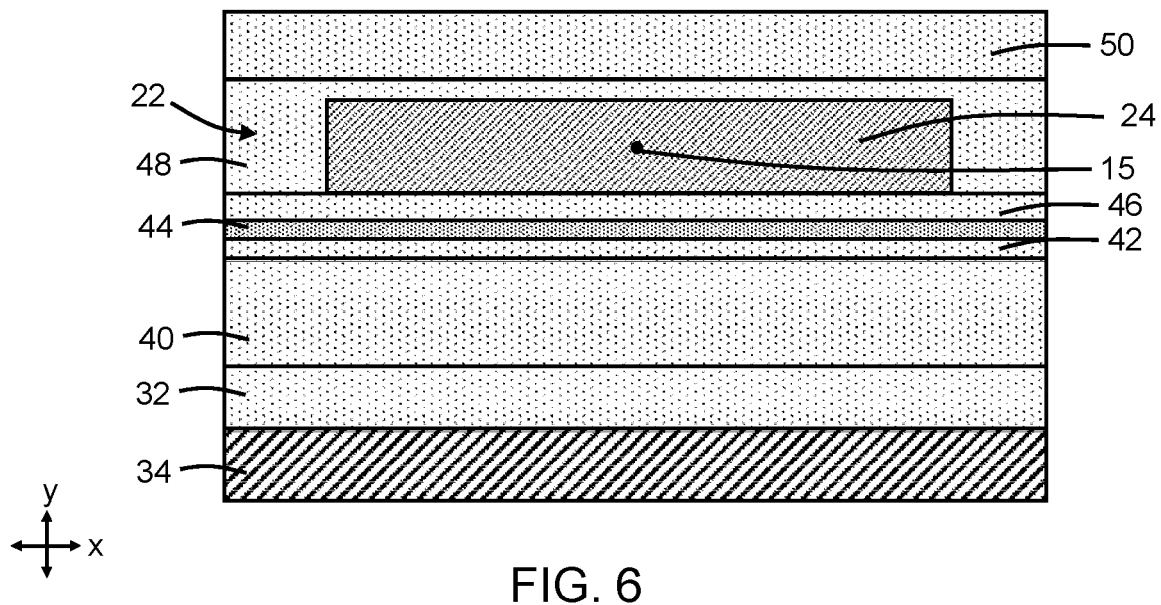

With reference to FIG. 6 and in accordance with alternative embodiments of the invention, the waveguide crossing 12 and the waveguide cores 14, 16, 18, 20 may be composed of a different material and may be located over the dielectric layer 46 and embedded in dielectric layer 48. In an embodiment, the waveguide crossing 12 may be composed of a dielectric material, such as silicon nitride. The waveguide crossing 12 and the waveguide cores 14, 16, 18, 20 may be formed by depositing a layer of the dielectric material on the dielectric layer 46, and then patterning the deposited layer with lithography and etching processes that lithographically form an etch mask over the deposited layer and etch the masked deposited layer with an etching process, such as reactive ion etching (RIE).

Figure 7:
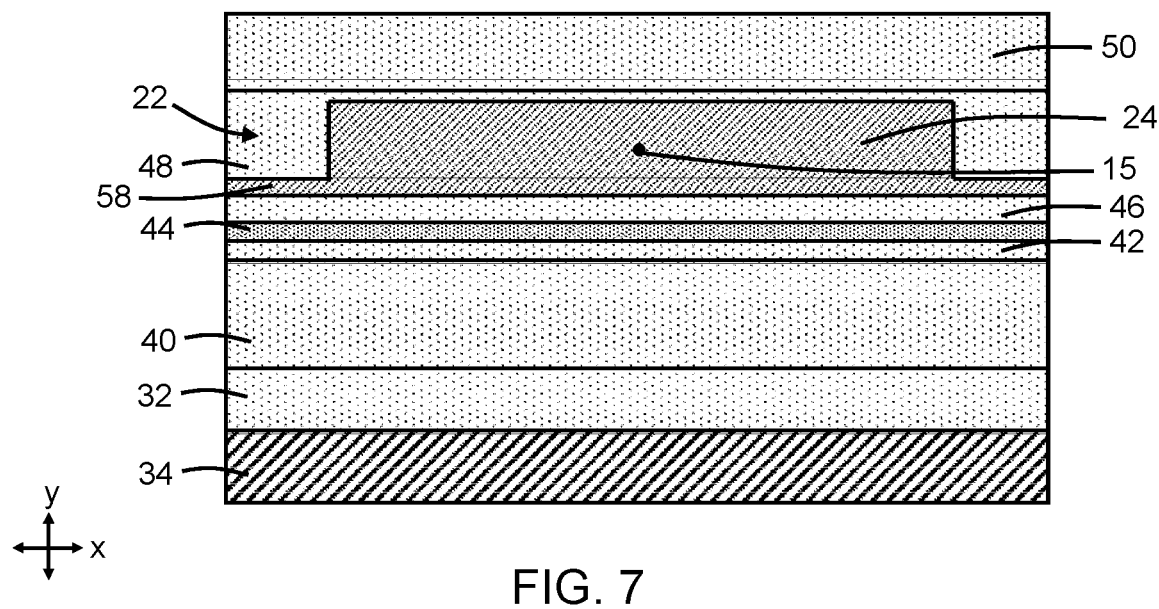

With reference to FIG. 7 in which like reference numerals refer to like features in FIG. 6 and in accordance with alternative embodiments of the invention, the deposited layer may be partially etched adjacent to sidewalls of the waveguide crossing 12 and the waveguide cores 14, 16, 18, 20 during patterning to define a slab layer 58. The slab layer 58, which is in direct contact with the dielectric layer 46, is coupled to the waveguide crossing 12 and the waveguide cores 14, 16, 18, 20. The slab layer 58 is thinner than the waveguide crossing 12 and the waveguide cores 14, 16, 18, 20, which are masked during patterning. The waveguide crossing 12 and the waveguide cores 14, 16, 18, 20 may have a rib construction due to the addition of the slab layer 58.

Figure 8:
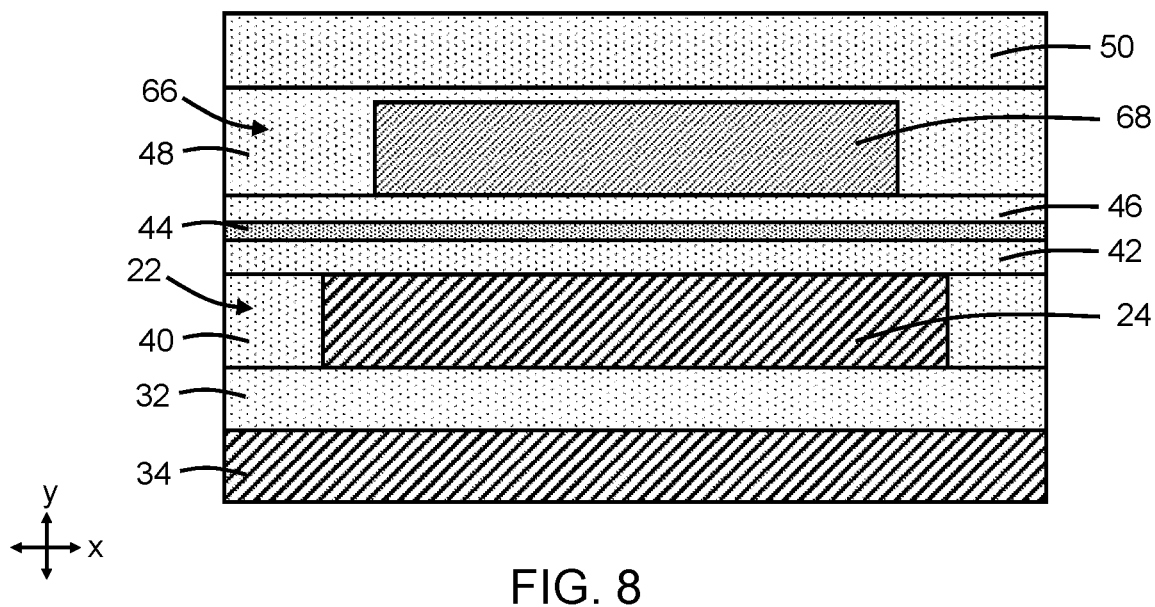
FIG. 8 is a cross-sectional view of a structure in accordance with alternative embodiments of the invention.
Figure 8A:
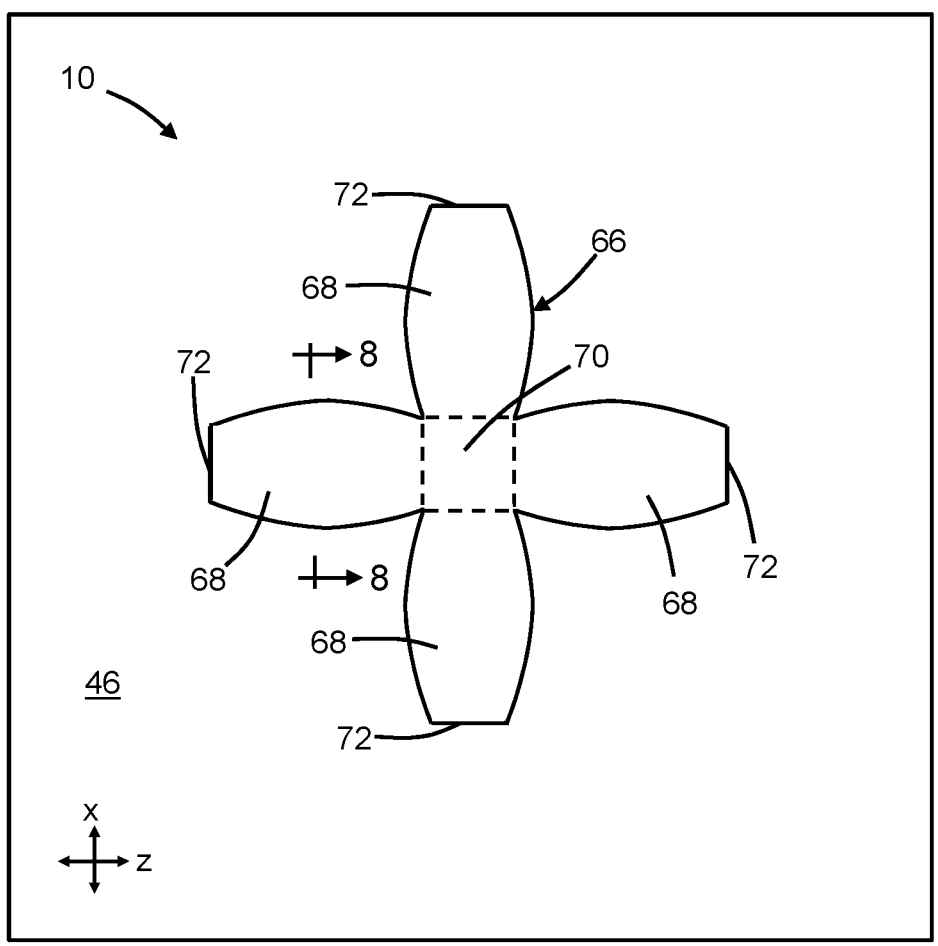

With reference to FIGS. 8, 8A in which like reference numerals refer to like features in FIG. 4 and in accordance with alternative embodiments of the invention, the structure 10 may further include a waveguide crossing 66 that is disposed over the waveguide crossing 12. The arms 68 of the waveguide crossing 66 may be located in a vertical direction over (i.e., above in the y-direction) the arms 22, 24, 26, 28 of the waveguide crossing 12 in a stacked relationship. In an embodiment, the arms 68 of the waveguide crossing 66 may have the same shape as the arms 22, 24, 26, 28 of the waveguide crossing 12 with interfaces similar to interfaces 36, 38, as well as a central section 70 that is similar to central section 30 of the waveguide crossing 12. The arms 68 of the waveguide crossing 66 may terminate at respective ends 72 that are analogous to the interfaces 36 of the arms 22, 24, 26, 28 of the waveguide crossing 12 and each ends 72 may terminate over one of the arms 22, 24, 26, 28 of the waveguide crossing 12.

The waveguide crossing 66 may be composed of a material having a different composition than the material from which the waveguide crossing 12 is composed. In an embodiment, the arms 68 of the waveguide crossing 66 may be composed of a dielectric material, such as silicon nitride, and the arms of the waveguide crossing 12 may be composed of a single-crystal semiconductor material, such as single-crystal silicon. In an alternative embodiment and as shown in FIG. 9, the arms 68 of the waveguide crossing 66 may be composed of a polycrystalline semiconductor material (e.g., polycrystalline silicon), and the arms of the waveguide crossing 12 may be composed of a single-crystal semiconductor material, such as single-crystal silicon.

Generally, the waveguide crossing 12 and the waveguide crossing 66 are composed of respective materials of different composition and define a bilayer or multiple-layer stack of the different materials. The addition of the waveguide crossing 66 over the waveguide crossing 12 may function to improve the performance of the waveguide crossing 12. For example, insertion loss may be reduced by the addition of the waveguide crossing 66 over the waveguide crossing 12.

In alternative embodiments, the waveguide crossing 66 of FIG. 8 may be arranged over the waveguide crossing 12 of FIG. 6 or FIG. 7. In alternative embodiments, the waveguide crossing 66 of FIG. 8 may be arranged beneath the waveguide crossing 12 of FIG. 6 or FIG. 7. In alternative embodiments, the waveguide crossing 66 of FIG. 8 may be arranged beneath the waveguide crossing 12 of FIG. 6 or FIG. 7, and the waveguide crossing 66 may be composed of a single-crystal semiconductor material, such as single-crystal silicon. In alternative embodiments, one or more waveguide crossings 66 may be arranged above and beneath the waveguide crossing 12 of FIG. 6 or FIG. 7.

Figure 9:
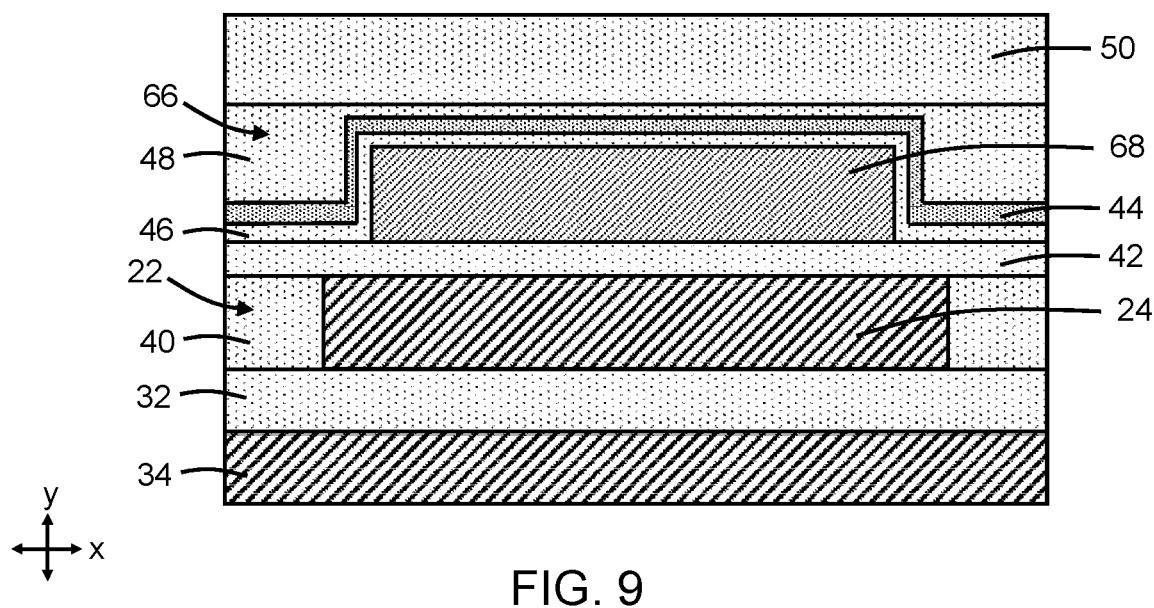
FIG. 9 is a cross-sectional view of a structure in accordance with alternative embodiments of the invention.

In alternative embodiments, the waveguide crossing 66 of FIG. 8 may be arranged over the waveguide crossing 66 of FIG. 9 such that both waveguide crossings 66 are arranged over the waveguide crossing 12 of FIG. 4 or FIG. 5. In alternative embodiments, an additional waveguide crossing (not shown) may be formed from the single-crystal semiconductor material of the device layer and may be arranged beneath the waveguide crossing 12 of FIG. 6 or FIG. 7 in addition to the waveguide crossing 66 of FIG. 8 to provide a three-layer layer stack. In alternative embodiments, the waveguide crossing 66 of FIG. 8 and the waveguide crossing 66 of FIG. 9 may be added to the waveguide crossing 12 of FIG. 6 or FIG. 7 to provide a three-layer stack.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide core; and
   a first waveguide crossing including a central section and a first arm positioned between the first waveguide core and the central section, the first arm and the first waveguide core aligned along a first longitudinal axis, the first arm coupled to the first waveguide core at a first interface, and the first arm coupled to a first portion of the central section at a second interface,
   wherein the first arm has a first width at the first interface, a second width at the second interface, and a third width between the first interface and the second interface, the third width is greater than the first width, and the third width is greater than the second width.

2. The structure of claim 1 wherein the first width is less than the second width.

3. The structure of claim 1 wherein the first arm has a side surface with a curvature defined by a cosine function.

4. The structure of claim 3 wherein the first arm includes a first section and a second section, the first section has a first length that is dependent on a first ratio of the first width to the third width, and the second section has a second length that is dependent on a second ratio of the second width to the third width.

5. The structure of claim 1 wherein the first width and the second width are unequal, and the third width is asymmetrically located along the first longitudinal axis between the first interface and the second interface.

6. The structure of claim 1 wherein the first width and the second width are equal, and the third width is symmetrically located along the first longitudinal axis between the first interface and the second interface.

7. The structure of claim 1 further comprising:
   a second waveguide core,
   wherein the first waveguide crossing includes a second arm with a third interface coupled to the second waveguide core and a fourth interface coupled to a second portion of the central section, the second arm having a fourth width at the third interface, a fifth width at the fourth interface, and a sixth width between the third interface and the fourth interface, the sixth width greater than the fourth width, and the sixth width greater than the fifth width.

8. The structure of claim 7 wherein the second arm and the second waveguide core are aligned along the first longitudinal axis.

9. The structure of claim 7 wherein the first width is equal to the fourth width, the second width is equal to the fifth width, and the third width is equal to the sixth width.

10. The structure of claim 7 wherein the first arm has a first side surface with a first curvature defined by a first cosine function, the second arm has a second side surface with a second curvature defined by a second cosine function, and the first curvature is substantially identical to the second curvature.

11. The structure of claim 7 wherein the first arm has a first side surface with a first curvature defined by a first non-linear function, and the second arm has a second side surface with a second curvature defined by a second non-linear function, and the second curvature that is substantially identical to the first curvature.

12. The structure of claim 7 wherein the first waveguide crossing includes a third arm coupled to a third portion of the central section and a fourth arm coupled to a fourth portion of the central section, and the first arm, the second arm, the third arm, and the fourth arm have respective side surfaces with curvatures defined by cosine functions.

13. The structure of claim 12 wherein the first arm and the second arm are aligned along the first longitudinal axis, and the third arm and the fourth arm are aligned along a second longitudinal axis that is transverse to the first longitudinal axis.

14. A structure comprising:
   a first waveguide crossing including a first central section, a first plurality of arms aligned along a first longitudinal axis, and a second plurality of arms aligned along a second longitudinal axis that is oriented transverse to the first longitudinal axis, each of the first plurality of arms and the second plurality of arms connected to a different portion of the first central section; and
   a second waveguide crossing including a second central section and a third plurality of arms, each of the third plurality of arms connected to a different portion of the second central section, at least one of the third plurality of arms positioned over one of the first plurality of arms, and at least one of the third plurality of arms positioned over one of the second plurality of arms, wherein the first waveguide crossing is comprised of a first material, and the second waveguide crossing is comprised of a second material that is different in composition from the first material.

15. The structure of claim 14 wherein the second central section of the second waveguide crossing positioned over the first central section of the first waveguide crossing, and each of the third plurality of arms respectively terminates at an end that is located over either one of the first plurality of arms or one of the second plurality of arms.

16. A method comprising:
patterning a layer of material to define a first waveguide core and a waveguide crossing including a central section and a first arm positioned between the first waveguide core and the central section,
wherein the first arm and the first waveguide core are aligned along a longitudinal axis, the first arm is coupled to the first waveguide core at a first interface, the first arm is coupled to a first portion of the central section at a second interface, the first arm has a first width at the first interface, a second width at the second interface, and a third width between the first interface and the second interface, the third width is greater than the first width, and the third width is greater than the second width.

17. The method of claim 16 wherein the first width is less than the second width.

18. The method of claim 16 wherein the first arm has a side surface with a curvature defined by a cosine function.

19. The method of claim 16 wherein the first width and the second width are unequal, and the third width is asymmetrically located along the longitudinal axis between the first interface and the second interface.

20. The method of claim 16 wherein the layer of material is patterned to define a second waveguide core and a second arm of the waveguide crossing, the second arm has a third interface coupled to the second waveguide core and a fourth interface coupled to a second portion of the central section, the first arm has a first side surface with a first curvature defined by a first cosine function, the second arm has a second side surface with a second curvature defined by a second cosine function, and the first curvature is substantially identical to the second curvature.

* * * * *